US007869936B2

(12) United States Patent
Donatelli et al.

(10) Patent No.: US 7,869,936 B2
(45) Date of Patent: Jan. 11, 2011

(54) ROUTING METHOD AND SYSTEM

(75) Inventors: Alessandro Donatelli, Rome (IT); Gianluca Gargaro, Rome (IT); Marco Martino, Rome (IT); Patrizio Trinchini, Genzano di Roma (IT)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 11/774,770

(22) Filed: Jul. 9, 2007

(65) Prior Publication Data

US 2008/0015774 A1  Jan. 17, 2008

(30) Foreign Application Priority Data

Jul. 11, 2006 (EP) ................... 06116980

(51) Int. Cl.
*G08G 1/0968* (2006.01)
*G08G 1/127* (2006.01)
(52) U.S. Cl. ...................... 701/118; 340/988
(58) Field of Classification Search ......... 701/200–226, 701/117–119; 340/988–996
See application file for complete search history.

(56) References Cited

U.S. PATENT DOCUMENTS

| | | | | |
|---|---|---|---|---|
| 5,610,821 A * | 3/1997 | Gazis et al. | ............. | 455/456.5 |
| 5,812,069 A * | 9/1998 | Albrecht et al. | ............. | 340/905 |
| 6,236,932 B1 * | 5/2001 | Fastenrath | ................... | 701/117 |
| 6,240,364 B1 * | 5/2001 | Kerner et al. | ............... | 701/210 |
| 6,282,486 B1 * | 8/2001 | Bates et al. | ................. | 701/117 |
| 2003/0065442 A1 * | 4/2003 | Touney | ....................... | 701/210 |
| 2005/0027446 A1 * | 2/2005 | Ishibashi et al. | ............ | 701/209 |
| 2006/0241855 A1 * | 10/2006 | Joe et al. | .................... | 701/202 |
| 2009/0281850 A1 * | 11/2009 | Bruce et al. | .................... | 705/7 |
| 2010/0057346 A1 * | 3/2010 | Ehrlacher | .................. | 701/202 |

\* cited by examiner

*Primary Examiner*—Mark Hellner
*Assistant Examiner*—Ari M. Diacou
(74) *Attorney, Agent, or Firm*—Garg Law Firm, PLLC; Rakesh Garg; Jeffrey S. LaBaw

(57) ABSTRACT

A method of route determination for mobile elements in a network comprising a plurality of paths each having a predetermined path capacity. The method comprises the steps of registering centrally a plurality of route requests from a corresponding plurality of mobile elements each of said requests defining a journey between an origin and a destination and registering centrally for each route request a journey start time. Routing instructions are centrally determined so as to optimise use of path capacity across all synchronous journeys requests in said network with reference to said registered information, and issued to corresponding mobile elements. The mobile elements adapt their route to comply with the routing instruction. There may be provided further steps of monitoring and rerouting the mobile element whenever new journeys requests can impact its remaining trip.

15 Claims, 8 Drawing Sheets

ROUTING METHOD AND SYSTEM

FIELD OF THE INVENTION

The present invention relates to route determination.

BACKGROUND OF THE INVENTION

Over recent years road networks in many areas have become increasingly congested. A number of technological tools exist to help road users under such difficult circumstances. For example, a combination of UPS technology and map databases makes it feasible for road users to monitor their position in the road network in real time. Such systems can be further enhanced with route calculation algorithms which assist a user in identifying a preferred route from his present location to a specified destination. Such a system is described in US20050209773A1. Such a preferred route may be selected as being the geometrically shortest route, or one which uses a maximum of fast roads, or a compromise of the two so as to provide a predicted fasted route. It is known in the prior art for a vehicle equipped with location equipment such as a GPS receiver and radio telecommunications devices such as a cellular telephone to request navigation information from a central navigation system via the cellular telephone network. This central navigation system will have not only map databases and route calculation algorithms as discussed above, but will offer the advantage over mobile standalone navigation systems that the central map database may be regularly updated so as to take into account road works, accidents etc. affecting routing decisions. By this means better routing information may be provided. US20050027446 describes such an approach.

As will be readily appreciated, the actual time that it may take to travel a particular route may bear little resemblance to a journey duration predicted on the basis of ideal or average conditions. Traffic conditions are a key factor in any real journey duration, in particular in metropolitan areas.

It may be envisaged to augment the prior art system described above so as to receive journey report information from vehicles that have requested navigation information, so as to compile information reflected journey times using different routes through the route network. The system may thus take the historical information thus gathered into account when calculating an optimum route, so as to recommend in preference such routes as have proved in the past to be most rapid.

Traffic conditions generally display cyclic characteristics. The most obvious of these will be rush hour maxima on weekdays, low traffic on Sundays etc. More subtle effects and effects having a longer cycle period such as annual holidays etc may also be noticeable. Where historical information is gathered as described above, an analysis of the collected information may be carried out in order to detect such cyclic effects. A further degree of intelligence may thereby be built into the system, such that recommended routing is optimised for the particular time and date at which the journey in question is to be carried out. U.S. Pat. No. 6,892,131 relates to such an arrangement.

SUMMARY OF THE INVENTION

According to the present invention there is provided a method of route determination according to the appended independent claim 1, a computer program according to the appended claim 6, a computer readable medium according to the appended claim 7 and a system according to according to the appended claim 8. Preferred embodiments are defined in the dependent claims.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Where a large number of vehicles submit similar journey information at a similar time, on the basis of the prior art techniques described above, in each case the navigation system will produce similar advice, which will in itself lead to an increase in traffic along the preferred routes, which may paradoxically lead to those taking the advice of the navigation system experiencing a longer journey time than if that had simply taken a random or most obvious route.

Thus according the present invention, a navigation system is adapted to optimise road capacity usage by issuing instructions such as to distribute road users across the various available routes. In other words, by maintaining information as to the present and predicted position of the various vehicles presently in transit, from information derived from the navigation information communications with those vehicles, the system may continuously optimise its navigation instructions to as to avoid the danger of itself inducing disadvantageous traffic conditions for its users, and indeed other road users.

In the following examples when a journey is described between one node and another, by convention the journey starts at the first node mentioned and terminates at the second. Naturally the journeys as described may form parts of larger journeys.

Figure 1A:
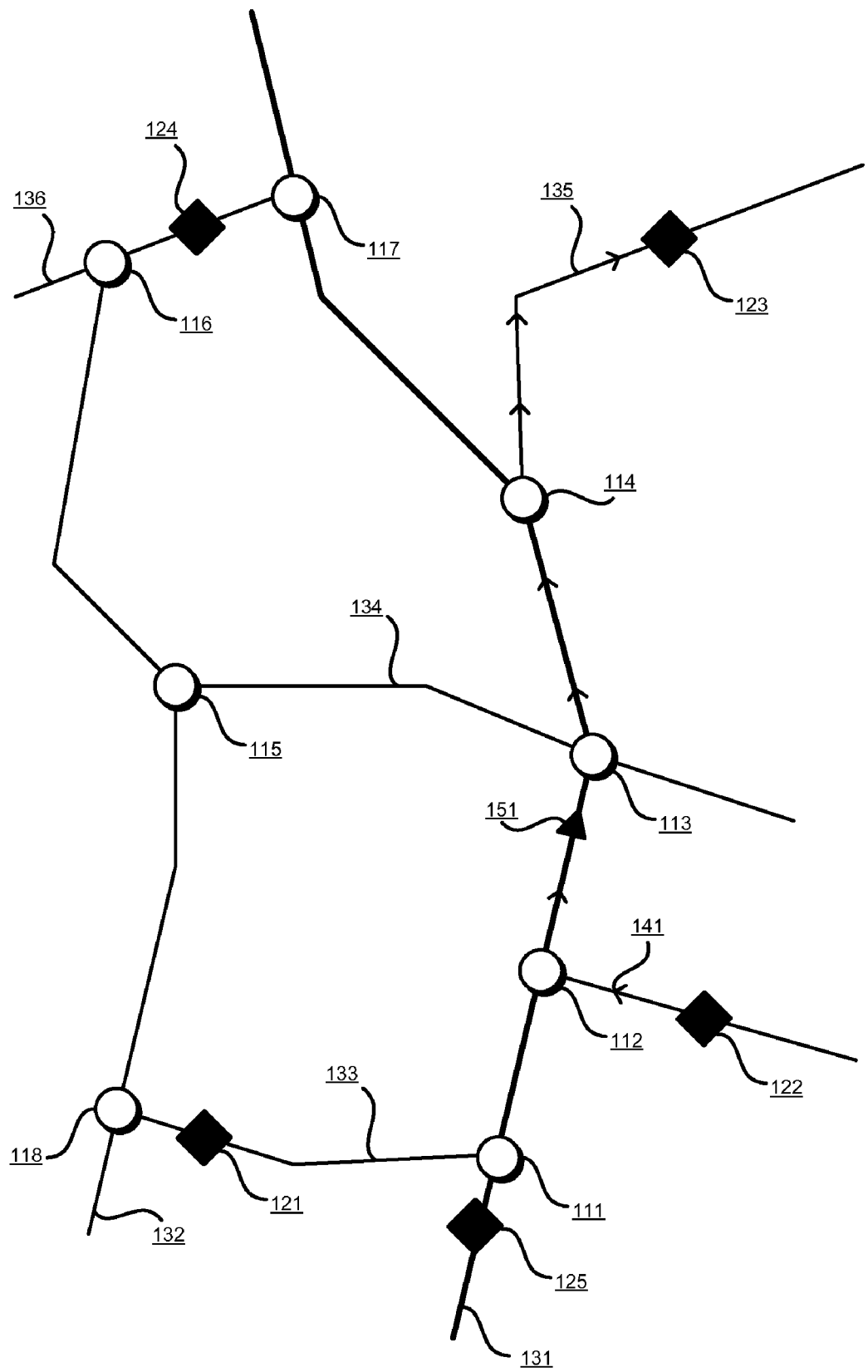
FIG. 1 exemplifies a first embodiment of the invention.

FIG. 1 exemplifies a first embodiment of the invention. In FIG. 1a there is shown a road network within which a first vehicle 151 is travelling. The network comprises a plurality of paths, or roads 131, 132, 133, 134, 135 and 136. There are defined a plurality of nodes 111, 112, 113, 114, 115, 116, 117, 118, defining the points at which the different roads intersect. Specifically, road 133 meets road 131 at node 111 where road 133 terminates. Road 133 meets road 132 at node 118 where road 133 terminates. Road 134 meets road 132 at node 115 where road 134 terminates. Road 134 intersects road 131 at node 113. Road 135 meets road 131 at node 114 where road 135 terminates. Road 137 meets road 131 at node 112 where road 137 terminates. Road 136 meets road 131 at node 117 where road 136 terminates. Road 132 meets road 136 at node 116 where road 132 terminates. There are further defined waypoints 121, 122, 123, 124 and 125 at specific points in the road network. Specifically, waypoint 121 is situated on road 133 between nodes 111 and 118. Waypoint 122 is situated on road 137. Waypoint 123 is situated on road 135. Waypoint 124 is situated on road 136 between nodes 117 and 116 and waypoint 125 is situated on road 131 beyond node 125. The road 131 is a high capacity main road, want the other roads are low capacity secondary roads.

As shown in FIG. 1, a vehicle 151 has requested navigation information from waypoint 122 to waypoint 123. For the purposes of this example we shall assume the vehicle requests routing information for a journey which it proposes to undertake immediately. The navigation system registers the time of the request for information. The system next consults its map database, and implements a routing algorithm in order to identify an optimum route. The system may take into account time specific information such as cyclic traffic measurements and knowledge of temporary route information such as the presence of road works etc. As indicated by the arrows 141, the system identifies an optimum route from waypoint 122 to 123, via nodes 112, 113 and 114. Information describing at least a first part of the journey is transmitted to the vehicle 151, which begins its journey. Thus as shown in FIG. 1a in particular, the vehicle 151 has already begun its journey, has made a right turn at node 112 and is now proceeding along road 131 toward node 113.

Figure 1B:
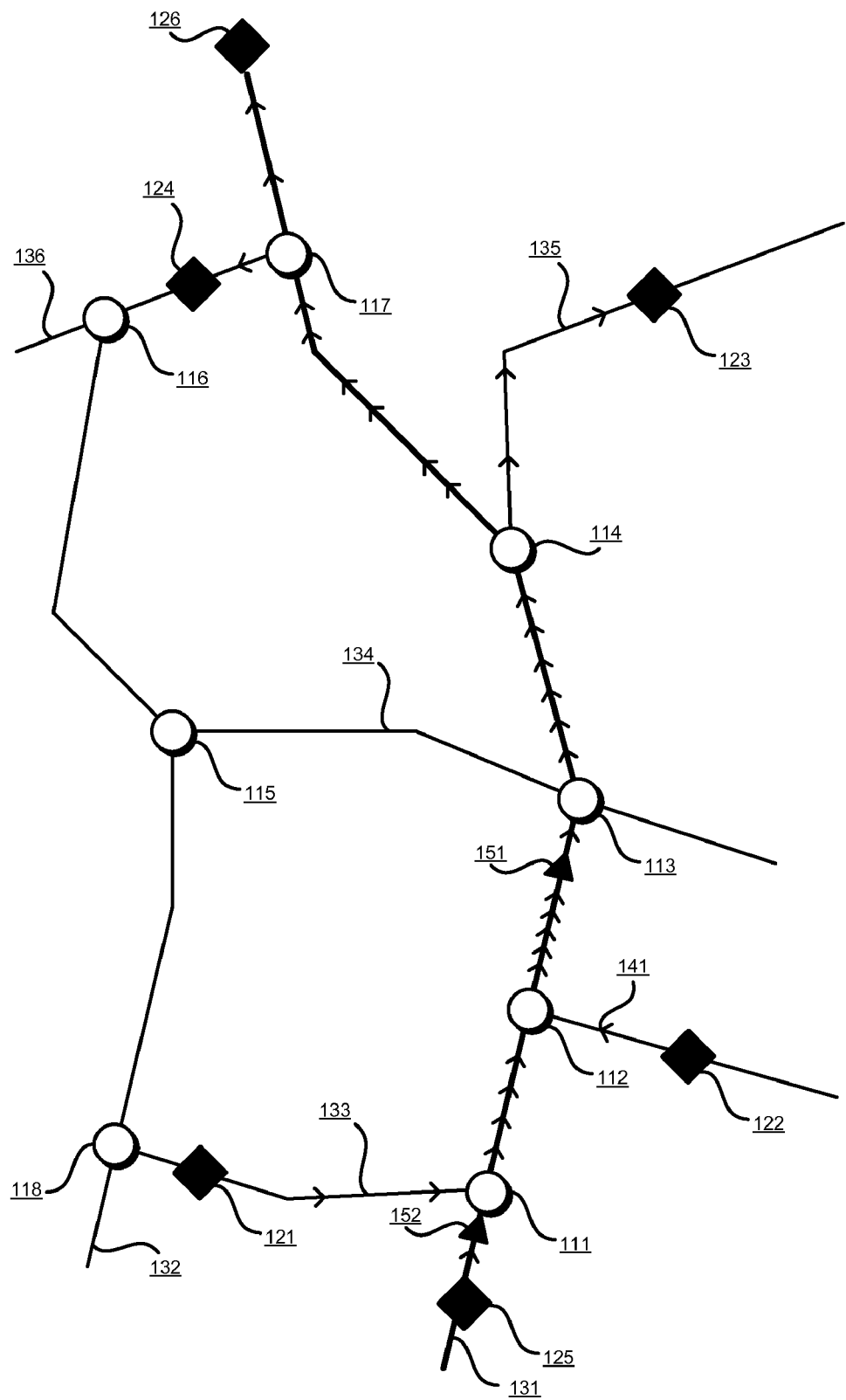

Turning now to FIG. 1b, imagine that a second vehicle 152 had previously requested navigation information for a journey between nodes 125 and 126, and that after the request by the vehicles 151 and 152, a third request is received for a third journey between nodes 121 and 124. According to an approach derived from prior art techniques described above, the system will calculate for each vehicle an optimum use. On the basis of the road network described with respect to FIG. 1a, in each case the theoretically fastest route will pass via the trunk route 131. In FIG. 1b this road usage is represented by the chevrons 141, where the density of chevrons on any given length of road roughly indicates the degree of usage of that length of road due to the navigation guidance provided by the system. Since in each case the theoretically fastest route will pass via the trunk road 131, the part of this road shared by all three journeys between nodes 112 and 114 is naturally very busy, as evinced by the density of chevrons 141 in these regions. Thus if the timing of the three journeys is such that they will pass through these parts of their respective journeys at similar times, the journey time in at least some cases will be increased by the weight of traffic that the simultaneous users represent. While this effect may not be critical in the case of the three vehicle scenario adopted here for the sake of simplicity, in may be imagined the same effect when extended to the large number of journeys that will be handled simultaneously by a real system, the effect may rapidly become of great significance.

Figure 1C:
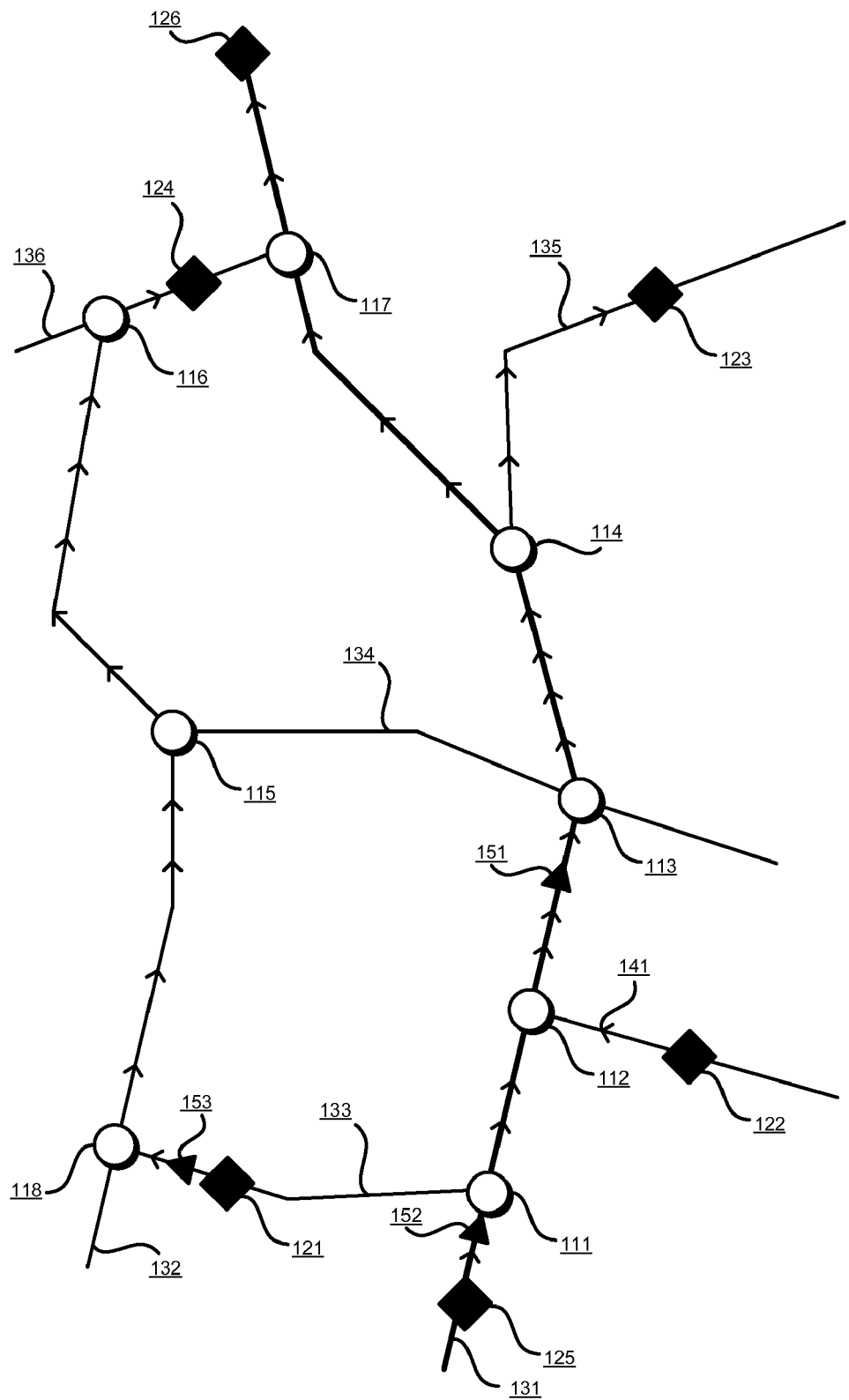

FIG. 1c shows a routing strategy according to the present invention. The situation is the same as that described above with regard to FIG. 1b, wherein a second vehicle 152 had previously requested navigation information for a journey between nodes 125 and 126, and that after the request by the vehicles 151 and 152, a third request is received for a third journey between nodes 121 and 124. However, according to this embodiment when the third request is received, it is determined that if the first degree guidance approach as described with respect to FIG. 1b is adopted, traffic conditions in the region between nodes 112 and 113 will deteriorate, so that this route no longer represents a fastest path for the third vehicle 153. It is then determined that an alternative route via nodes 118, 115 and 116 is preferable either for 153 alone, or for the common good of all three vehicles 151, 152 and 153.

Figure 2A:
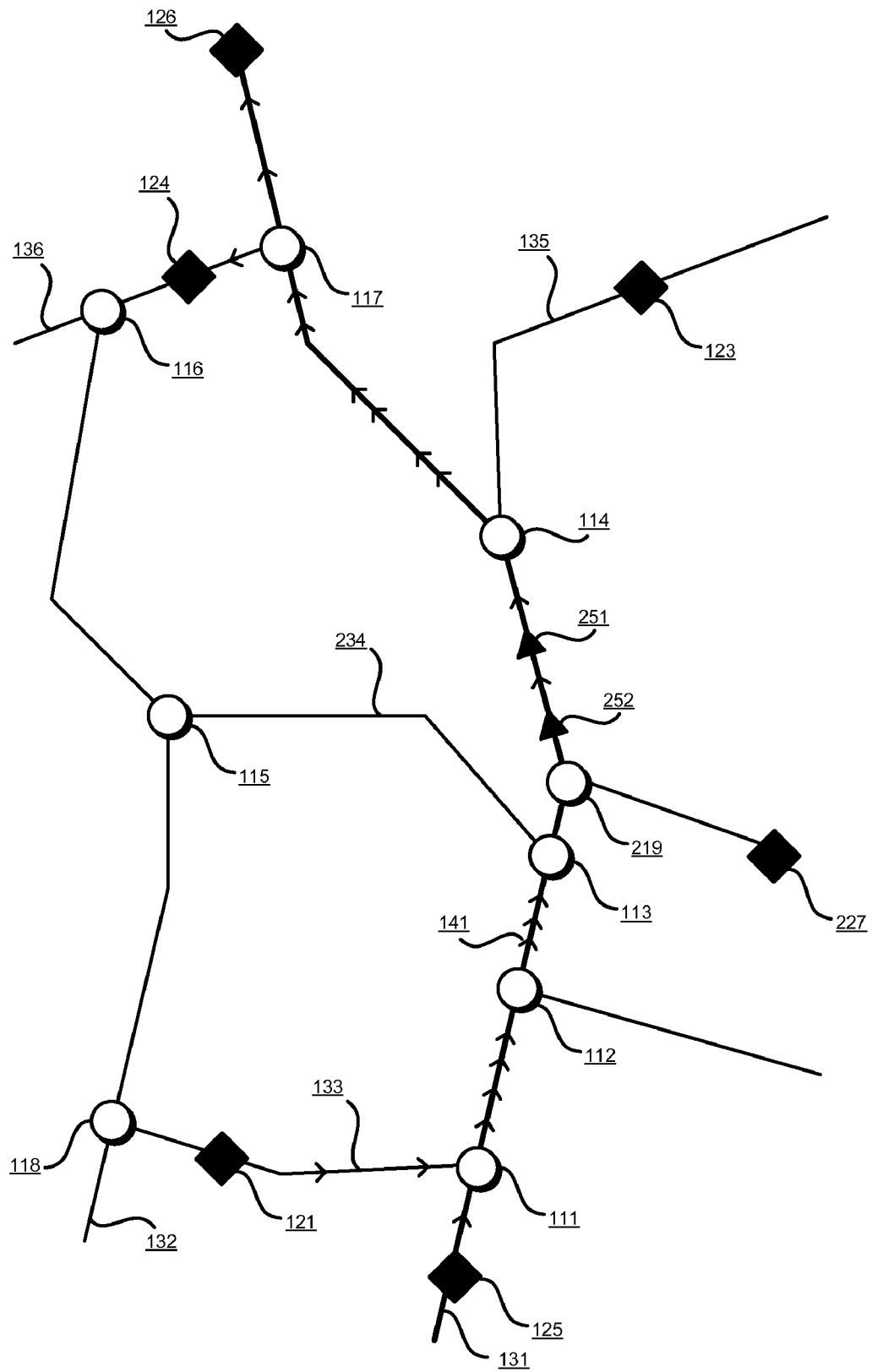
FIG. 2 exemplifies a second embodiment.

FIG. 2 exemplifies a second embodiment. According to this second embodiment, not only are new routes calculated so as to take into account traffic conditions resulting from previous requests, and optionally the effects of particular routing options for new requests on journeys corresponding to previous requests as described with respect to FIG. 1c, but the routes of all vehicles having requested navigation may be adapted on the fly so as to ensure optimal journey times for all users. FIG. 2a shows a road network similar to that of FIG. 1. The differences between the road network of FIG. 1 and FIG. 2 are as follow: Road 134 is removed, and new road 234 is provided between nodes 113 and 115. A new node 219 is added to road 131 between nodes 113 and 114. A new road 237 terminates at node 219. A way point 227 is provided on new road 237.

A vehicle 251 has requested navigation information from waypoint 121 to waypoint 124, and a second vehicle 252 has requested navigation information for a journey between nodes 125 and 126. In a similar manner to that described with respect to FIG. 1, both vehicles have been instructed to follow a path along truck road 131.

Figure 2B:
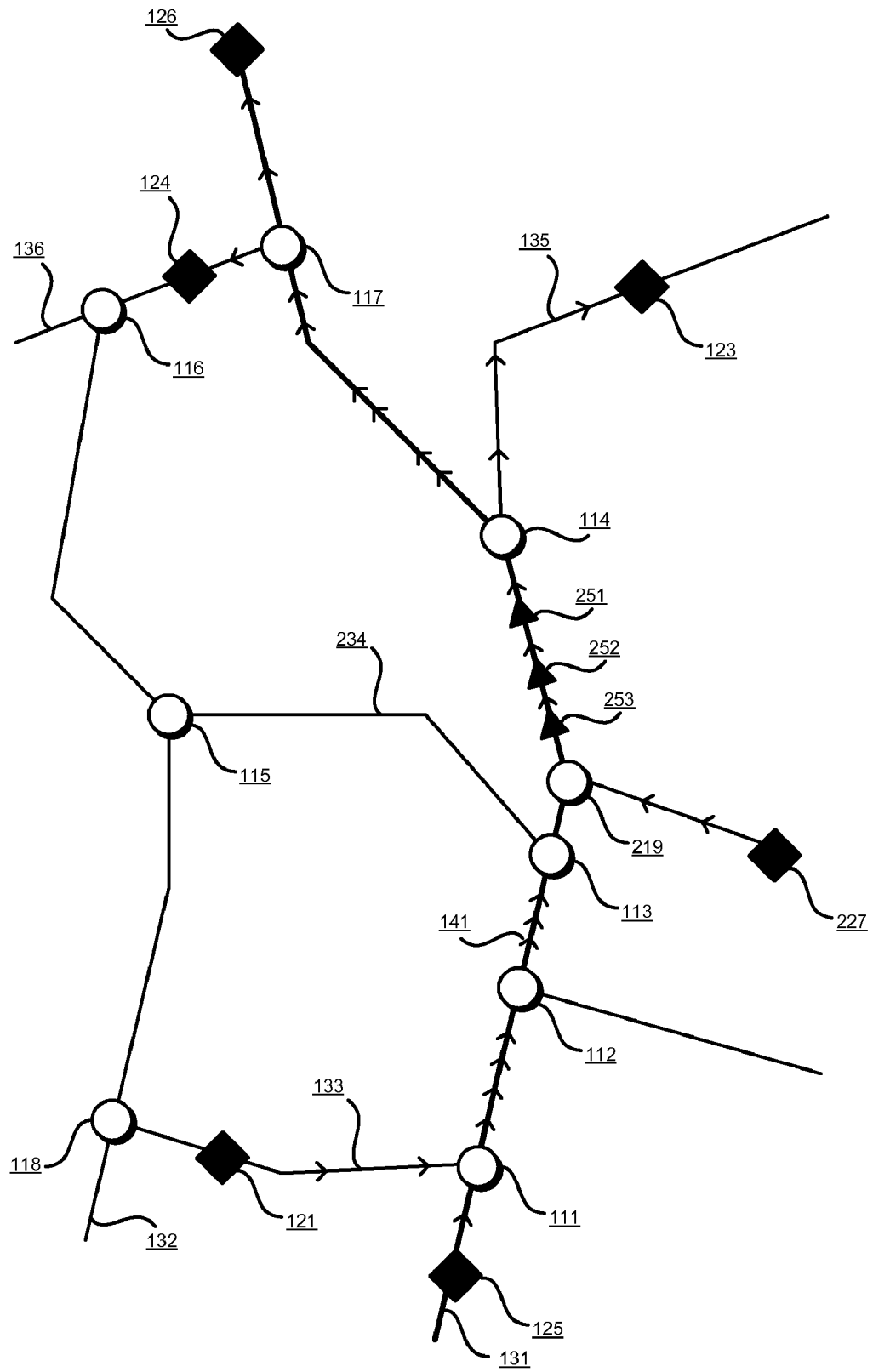

Imagine now that as vehicles 251 and 252 are in the vicinity of node 112, a third vehicle 253 requests routing information for a journey between waypoints 227 and 123. FIG. 2b illustrates such a situation. According to the approach of the first embodiment, the routes of vehicles 251 and 252 are already determined, and there is only one route available to vehicle 253, i.e. via road 131, with vehicles 251 and 252. This will lead to an undesirable traffic density on road 131, and in particular along the length of road 131 common to all three journeys, between nodes 219 and 114. This may lead to an increase in journey time for some or all vehicles.

Figure 2C:
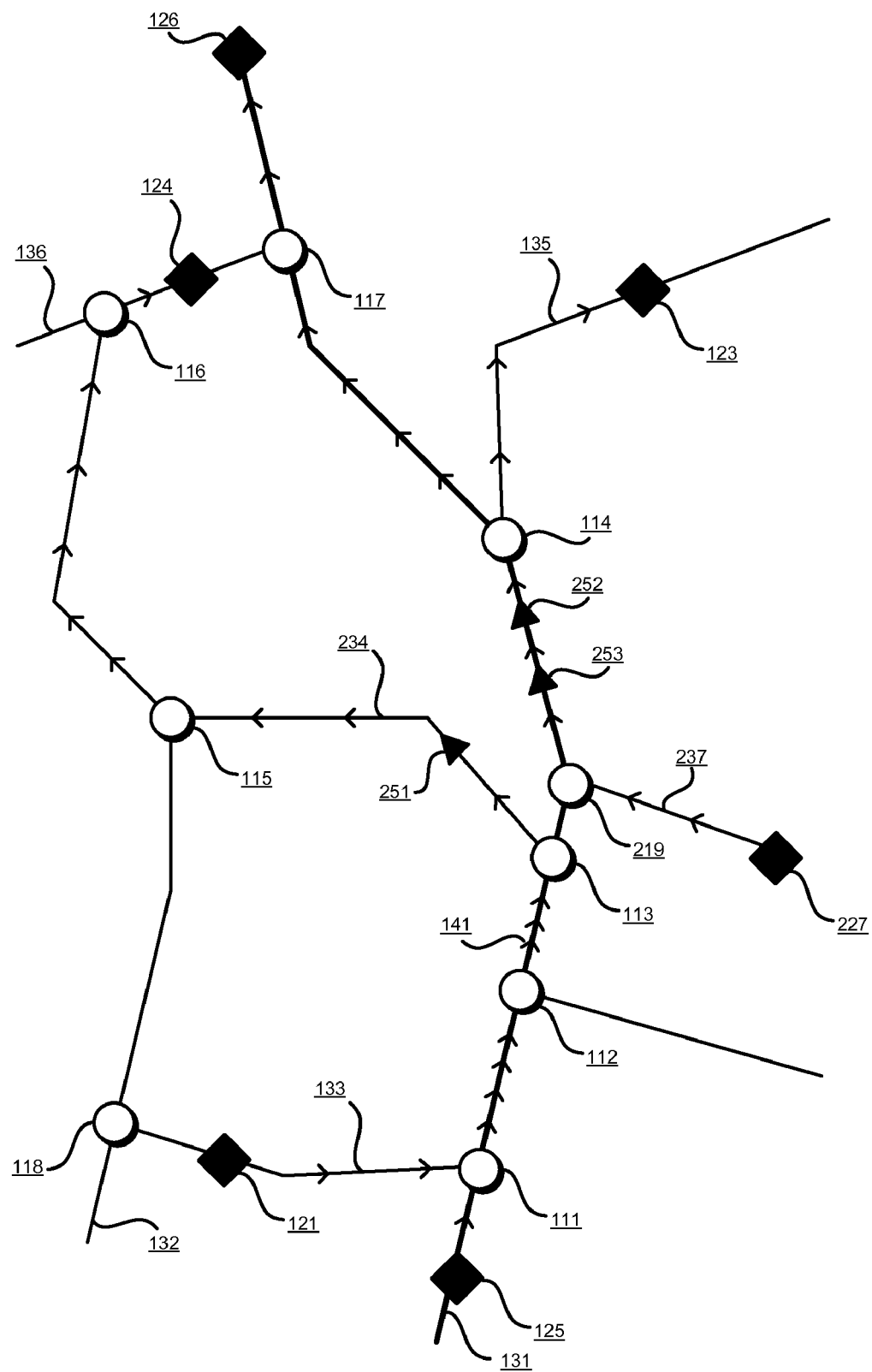

According to the second embodiment therefore, the route for vehicles 251 and 252 is recalculated. It is accordingly determined that either or both vehicles may be routed via road 134, 132 and 135, or nodes 115 and 116, thereby avoiding the contentious section of road between nodes 219 and 114. FIG. 2c illustrates a possible solution according to this approach. Specifically, vehicle 251 is diverted form its original route at node 113, to reach its destination at waypoint 124 via road 134, 132 and 136, or nodes 115 and 116. In this instance there is no need to divert both 251 and 252 in view of the superior capacity of road 131. Vehicle 251 is diverted rather than vehicle 252 since the diversion adds less to the journey time of 251 than it would to vehicle 252, in view of the distance between waypoint 124 and node 117.

It is desirable that users should notify the system of proposed journeys as far in advance as possible, so as to maximise the options for re-routing existing journeys, and to reduce the need for last minute re-routings of existing journeys. With respect to the routing solution of FIG. 2, if vehicle 253 had notifies its intentions earlier it might have been possible to route vehicle 151 via node 118 rather than changing its route at node 113. On the other hand, if vehicle 253 had notified its intentions later, it may have been too late to carry out any optimisation.

Clearly, it may not be possible in all cases to make decisions as to which vehicles should take which route, and which vehicles should be diverted via which route entirely fairly in any given situation. For example, where a number of vehicles a making the same journey, it may be necessary to divert some, but not all, of them. The question is thus how this decision should be made.

The simplest choice may be simply to pick at random. Otherwise, a record could be made of situations when a journey had been modified disadvantageously, so that future decisions could be made in that parties favour so as to balance out the overall effect. More sophisticated systems may be envisaged whereby users are able to express the urgency of there journey in order to influence such decisions Users might be entitled to designate a certain number or journeys, or journey kilometres per period of time or per total distance travelled as being urgent. Users might similarly be enables to designate a journey as being non-urgent, thus effectively volunteering to take less optimum routes when necessary. Extra designations could be awarded to reward customer loyalty, to compensate voluntary or non voluntary adoption of non-optimal routes, or in return for payment.

It may be envisaged that weightings may be assigned to different users according to which the optimisation of their journey times is prioritised over other users. Such weighting may be determined on the basis of many factors, including for example how far in advance they notified the system of their proposed journey, how regularly they use the system, or on payment of a premium for special treatment. Such prioritised treatment may be extended automatically to certain classes of vehicles, such as those associated with emergency services.

Figure 3:
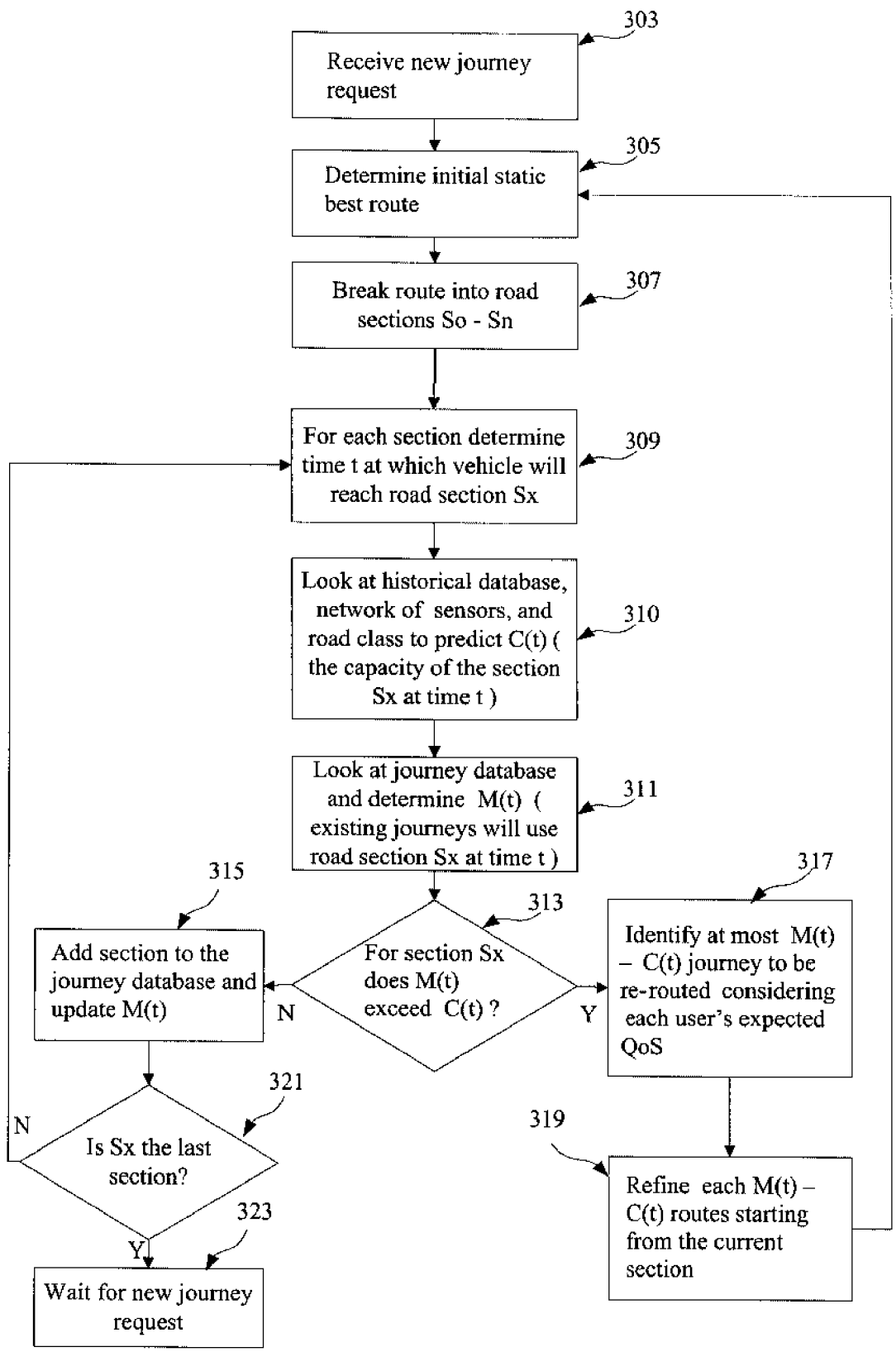
FIG. 3 shows a possible algorithm for route optimisation in accordance with the embodiments described with reference to FIG. 2.

FIG. 3 shows a possible algorithm for route optimisation in accordance with the embodiments described with reference to FIG. 2. A new journey request is received at step 3037 and with reference to the map database an initial static best route satisfying the request is determined at step 305. This initial route is broken into n road sections $S_o$ to $S_n$ at step 307, for example each substantially equally to a predetermined standard length. These road sub-sections are preferably pre-defined in the map database. At step 309 the time $t_x$ at which the requesting vehicle will reach road section x is determined for each section along the initial route. By reference to data sources such as a historical database, network of sensors, and road class data, the system determines a value of C(t), the capacity of the section Sx at time t at step 310. For each section, it is determined at step 311 the number of existing journeys M(t) that will use road section x at time t. At step 313 each value of M(x) is compared to a threshold value C(x), which is a maximum traffic level defined for each road section. In the preferred case where the road sub-sections are pre-defined in the map database, these threshold values can be stored together with other data concerning each road section in the map database. Thus for each road section along the initial route it is determined whether M(t) exceeds C(t). This is preferably implemented in the order in which the requesting vehicle will pass through the sections. If the instantaneous traffic level does not exceed the threshold value, for a given road section, that section is added to the journey database and M(t) is updated at step 315. If otherwise the instantaneous traffic level does exceed the threshold value, for a given road section, up to M(t)−C(t) journeys to be re-routed are identified considering each user's expected QoS at step 317. Each of these M(t)−C(t) routes is refined starting from the current section at step 319, defining for each refined route a new static path, which is then processed as for the initiating route by looping back to step 305. If at step 313 it is determined that the threshold is not exceeded, after adding the section to the database and updating M(t) at step 315 the method determines at step 321 whether section Sx is the last section in the route, i.e. if x=n. Where this is the case, the method proceeds to step 323, and waits for a new journey request. Otherwise the method loops back to step 309 to begin processing the next section, i.e. incrementing the value of x.

Different values of $C_n$ may be defined for each given road section as a function of time, in order to reflect the traffic levels that are realistic at different times of the day.

The valuation process as described with respect to FIG. 3 may be considered as corresponding to an evaluation of the optimal path according to weighted function w(C(t), M(t)), where M(t) is the number of booked journeys received by our system for section n and time t, and C(t)=Cs+C1(t) . . . +Cn(t), where
Cs=static section capacity (constant) Ci(t) are different time-dependent functions, as for example,
historical knowledge (the August 15th, or time interval between 7 a.m and 10 a.m., the section becomes always congested), and real time functions as weather condition,
incident info,
section work in progress and so on . . .

Assigning a route to a section updates the M(t) value. When M(t) is greater than C(t) for a road section, at most M(t)−C(t) rerouting will be needed for that section: It is not necessary to recalculate all journeys. As soon as M(t)−C(t) feasible reroutes are available, they are considered. Each decision concerning re-routing should be taken before getting to "decisional nodes" in the road network: the time interval to get there will be a limiting factor in the find solution.

The number of received re-routes should be taken in account to respect Quality of Service (QOS): multiple re-routes could "cost" much more than initial provided solution. This cost could be in terms of time, space or something else.

Figure 4:
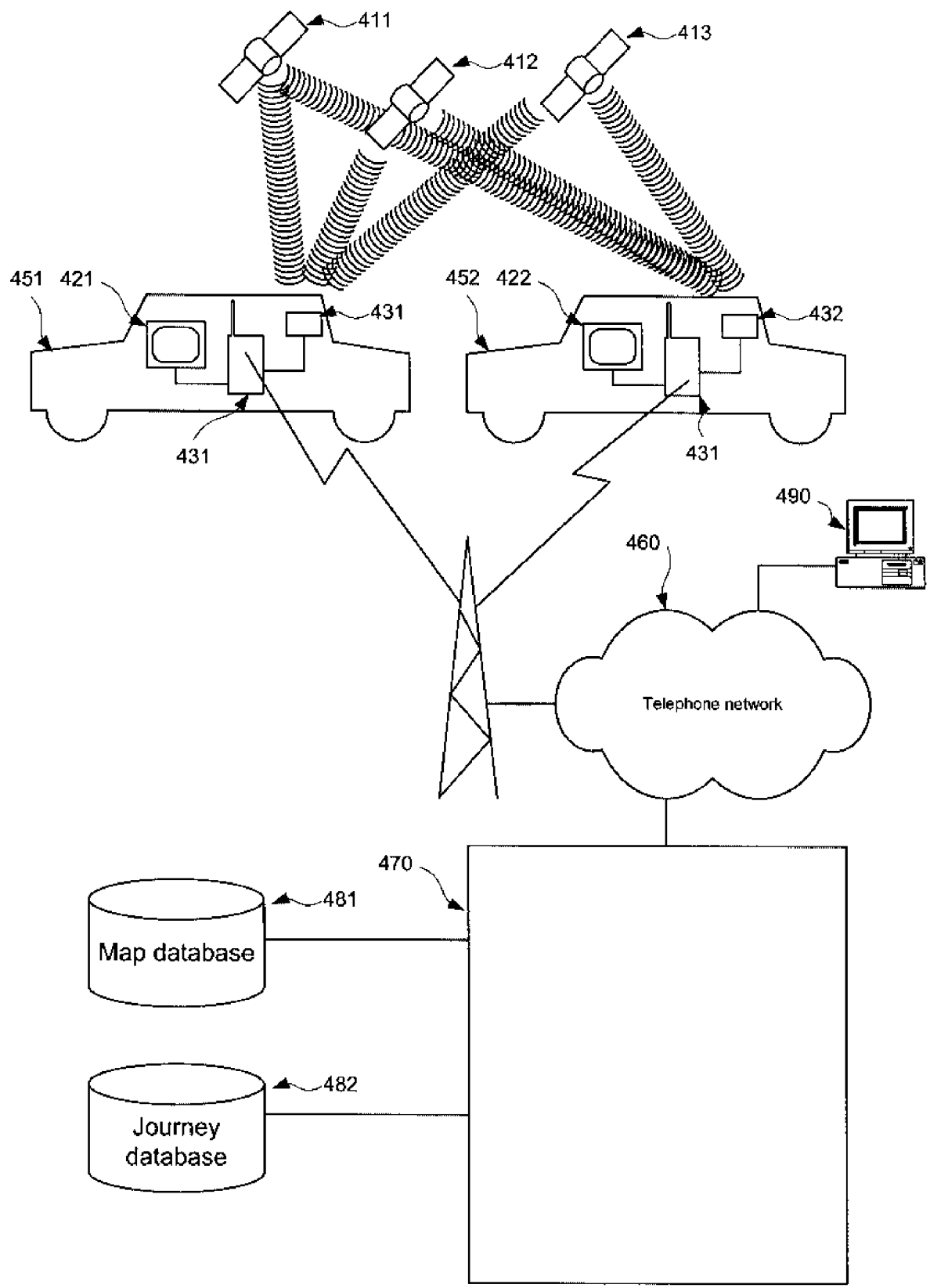
FIG. 4 shows a system suitable for implementing the present invention.

FIG. 4 shows a system suitable for implementing the present invention. As shown in FIG. 4, there is provided a constellation of navigation satellites 411, 412, 413 belonging for example to the OPS or Galileo systems. There are further provided a number of vehicles 451, 452, each of which carries a user interface unit 421, 422, a satellite positioning receiver 431, 432 and a cellular communication device 441, 442. Each satellite positioning receiver 431, 432 receives timing data transmitted by said navigation satellites 411, 412, 413, and thereby determines the instantaneous position of the vehicle in which it is located. There is further provided a cellular telephone network 460, which is capable of bi-directional communication with said cellular communication devices 441, 442. There is further provided a navigation processor 470, connected to said cellular telephone network 460 as well as a map database 481 and a journey database 482. According to an embodiment when a user sitting in a vehicle 451 or 452 enters a request for navigation information to a particular destination using his vehicles user interface unit 421, 422. Meanwhile, the satellite positioning receiver 431, 432 associated with the same vehicle processes signals received from the navigation satellites 411, 412, 413 so as to determine the vehicle's position. The cellular communication device 441, 442 is used to transmit the request data from the interface device and the position data from the satellite positioning receiver 431, 432 to the navigation processor 470 by means of the cellular telephone network 460. On receiving at least a present position and destination information, the navigation processor 470 implements a routing algorithm with reference to the map database 481 so as to determine a preferred route between the present position and the destination. This preferred route may be added to a journey database 482. The navigation processor 470 then proceeds to determine whether the adding of this new journey means that any particular part of the road network is now over-used. In a case where it is determined that a particular part of the road network is now over-used, the new journey, a subset of all journeys underway at the time in question or all journeys underway at the time in question are recalculated so as to optimise distribution over the road network as discussed above. Navigation information is transmitted via the network 460 to all vehicles presently in transit to bring them into accord with the newly calculated route data. Preferably the transmitted navigation data will comprise a series of location values suited for example to comparison with GPS data, and direction data associated with each location instruction. Thus the vehicle's user interface unit 421, 422 in each vehicle receives and stores the navigation data, and relays each direction to the user when it is determined in communication with the gps receiver 432 that the vehicle is approaching the relevant location. The user interface unit 421, 422 is further preferably adapted to detect a case where the vehicle's path diverges from the planned route. This will automatically provoke a new request for routing information.

The skilled person will appreciate that the satellite positioning receiver 431, 432 may be replaced with any of a wide range of mechanisms suited to the localisation of the vehicle. For example, by triangulation of signals from different base stations in adjacent cells of the cellular telephone system used for communications with the navigation processor 470, or by means of road sensors detecting an identifier in the vehicle such as an RFID tag, etc. Alternatively, a user may simply provide his own assessment of his position, for example by selecting a position on a map in a user interface. In a case where a user wishes to notify the system of a future intended journey, this approach may in any case be preferred if the user makes the notification whilst not in his vehicle or whilst at a location distant from the journey's start point. There may further be provided an interface device 490, such as a personal computer in communication with the network 460, or otherwise able to communicate with the navigation processor 470. This interface device 490 may be used to communicate with the navigation processor 470 concerning future proposed journeys. A variety of interface environments may be envisaged for the user interface unit 421, 422 or the interface device 490. For example may be able to enter address data or other alphanumeric data representing a location in the road network. The user may be presented with a map, upon which he may identify positions with a cursor, a touch screen or other such conventional interface method. The system may incorporate voice recognition features. The system may be able to access electronic recording media such as flash memory devices, mobile telephone sin cards etc. so as to brows and select from location data stored therein, for example in the form of address book entries. Wired or wireless interfaces to electronic devices such as PDAs, personal computers and mobile telephones etc may be envisaged so as to retrieve data therefrom in a similar manner.

The skilled person will similarly appreciate that any communications mean may be adapted to enable communications between the vehicle and the navigation processor 470. The means will preferably be wireless, and may comprise for example a stand-alone radio system not associated with a telephone network.

The skilled person will appreciate that while the present invention has been described in terms of vehicles travelling in a road network, the invention applies equally to any network through which different paths may be described. For example, the network may be a canal network, a network of shipping routes for example in open sea, air flight paths.

Correspondingly the vehicle as discussed above may comprise a manned or unmanned vehicle. It may be any wheeled or tracked vehicle, a boat or submarine, an aeroplane or helicopter and so on.

The skilled person will appreciate that while the present invention has been described in terms of vehicles travelling in a road network, the invention applies equally to any mobile element. For example, the mobile element may be a pedestrian. As such the network may correspond partially to a road network, and may be further extended to pedestrian routes such as footpaths, pedestrian only shopping areas, lifts and escalators etc.

According to an embodiment there is provided a method of route determination for mobile elements in a network comprising a plurality of paths each having a predetermined path capacity. The method comprises the steps of registering centrally a plurality of route requests from a corresponding plurality of mobile elements each of said requests defining a journey between an origin and a destination and registering centrally for each route request a journey start time. Routing instructions are centrally determined so as to optimise use of path capacity across all synchronous journeys requests in said network with reference to said registered information, and issued to corresponding mobile elements. The mobile elements adapt their route to comply with the routing instruction. There may be provided further steps of monitoring and rerouting the mobile element whenever new journeys requests can impact its remaining trip.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of route determination for mobile elements in a network comprising a plurality of paths each path having a predetermined path capacity, said method comprising:

registering centrally a plurality of route requests from a corresponding plurality of mobile elements each of said requests defining a journey between an origin and a destination;

registering centrally for each route request a journey start time; and performing, for a first journey in said journeys, further steps of centrally determining a routing instruction for a first part of the first journey, the routing instruction being sufficient to enable a corresponding mobile element to begin the first part of the first journey, issuing said routing instruction to the corresponding first mobile element, and said first mobile element adapting its route to comply with said routing instruction;

computing a second routing instruction for a second part of the first journey such that the second routing instruction causes the first mobile element to use a path in the network, transmitting the second routing instruction to the first mobile element, computing whether a second journey by a corresponding second mobile element coincides with the second part of the first journey over the path during a time period common to the first and second journeys, evaluating, responsive to the computing being affirmative, that the coincidence of the first and the second journeys causes the times for traversing the path to increase for the first and the second mobile elements, selecting the first journey for rerouting by comparing an effects of rerouting on the first and second journeys, recomputing the second routing instruction to cause the first mobile element to utilize a second path, issuing the recomputed second routing instruction to the first mobile element while the first mobile element is in transit on the first part of the first journey, and the first mobile element adapting its route to comply with the recomputed second routing instruction, thereby allowing optimal use of the path to the second mobile element.

2. The method of claim 1 further comprising, repeating for the plurality of mobile elements said steps of registering, and performing upon receiving successive further route requests from the plurality of mobile elements; and recomputing an issued routing instruction issued to a third mobile element whose third journey will traverse the path, and thereby maintain optimal use of path capacity.

3. The method of claim 1, wherein said step of selecting further takes into account a record of situations when a journey had been modified disadvantageously for a particular mobile element.

4. The method of claim 1, wherein said step of selecting further takes into account the urgency of a journey as asserted by a particular mobile element.

5. The method claim 1, wherein said step of selecting further takes into account how far in advance a particular mobile element notified the system of a proposed journey, how regularly the particular mobile element uses the system, or on payment of a premium for special treatment.

6. A computer readable storage medium including a computer program product comprising instructions for carrying out the steps of a method of route determination for mobile elements in a network comprising a plurality of paths each path having a predetermined path capacity when said computer program is executed on a computer, the method comprising:

registering centrally a plurality of route requests from a corresponding plurality of mobile elements each of said requests defining a journey between an origin and a destination;

registering centrally for each route request a journey start time; and performing, for a first journey in said journeys, further steps of centrally determining a routing instruction for a first part of the first journey, the routing instruction being sufficient to enable a corresponding mobile element to begin the first part of the first journey, issuing said routing instruction to the corresponding first mobile element, and said first mobile element adapting its route to comply with said routing instruction:

computing a second routing instruction for a second part of the first journey such that the second routing instruction causes the first mobile element to use a path in the network, transmitting the second routing instruction to the first mobile element, computing whether a second journey by a corresponding second mobile element coincides with the second part of the first journey over the path during a time period common to the first and second journeys, evaluating, responsive to the computing being affirmative, that the coincidence of the first and the second journeys causes the times for traversing the path to increase for the first and the second mobile elements, selecting the first journey for rerouting by comparing an effects of rerouting on the first and second journeys, recomputing the second routing instruction to cause the first mobile element to utilize a second path, issuing the recomputed second routing instruction to the first mobile element while the first mobile element is in transit on the first part of the first journey, and the first mobile element adapting its route to comply with the recomputed second routing instruction, thereby allowing optimal use of the path to the second mobile element.

7. The computer program product of claim 6, wherein the method further comprising, repeating for the plurality of mobile elements said steps of registering and performing upon receiving successive further route requests from the plurality of mobile elements; and recomputing an issued routing instruction issued to a third mobile element whose third journey will traverse the path, and thereby maintain optimal use of path capacity.

8. The computer program product of claim 6, wherein said step of selecting further takes into account a record of situations when a journey had been modified disadvantageously for a particular mobile element.

9. The computer program product of claim 6, wherein said step of selecting further takes into account the urgency of a journey as asserted by a particular mobile element.

10. The computer program product of claim 6, wherein said step of selecting further takes into account how far in advance a particular mobile element notified the system of a proposed journey, how regularly the particular mobile element use the system, or on payment of a premium for special treatment.

11. A system for route determination for mobile elements in a network comprising a plurality of paths each path having a predetermined path capacity, comprising:
- a storage device including a storage medium, wherein the storage device stores computer usable program code; and
- a processor, wherein the processor executes the computer usable program code, and wherein the computer usable program code comprises:
- computer usable code for registering centrally a plurality of route requests from a corresponding plurality of mobile elements each of said requests defining a journey between an origin and a destination;
- computer usable code for registering centrally for each route request a journey start time; and
- computer usable code for performing, for a first journey in said journeys, further including
  - computer usable code for centrally determining a routing instruction for a first part of the first journey, the routing instruction being sufficient to enable a corresponding mobile element to begin the first part of the first journey,
  - computer usable code for issuing said routing instruction to the corresponding first mobile element, and said first mobile element adapting its route to comply with said routing instruction;
  - computer usable code for computing a second routing instruction for a second part of the first journey such that the second routing instruction causes the first mobile element to use a path in the network,
  - computer usable code for transmitting the second routing instruction to the first mobile element,
  - computer usable code for computing whether a second journey by a corresponding second mobile element coincides with the second part of the first journey over the path during a time period common to the first and second journeys,
  - computer usable code for evaluating, responsive to the computing being affirmative, that the coincidence of the first and the second journeys causes the times for traversing the path to increase for the first and the second mobile elements, computer usable code for selecting the first journey for rerouting by comparing an effects of rerouting on the first and second journeys,
  - computer usable code for recomputing the second routing instruction to cause the first mobile element to utilize a second path,
  - computer usable code for issuing the recomputed second routing instruction to the first mobile element while the first mobile element is in transit on the first part of the first journey, and
  - the first mobile element adapting its route to comply with the recomputed second routing instruction, thereby allowing optimal use of the path to the second mobile element.

12. The system of claim 11, further comprising,
- computer usable code for repeating for the plurality of mobile elements said steps of registering and performing upon receiving successive further route requests from the plurality of mobile elements; and
- computer usable code for recomputing an issued routing instruction issued to a third mobile element whose third journey will traverse the path, and thereby maintain optimal use of path capacity.

13. The system of claim 11, wherein the computer usable code for selecting further takes into account a record of situations when a journey had been modified disadvantageously for a particular mobile element.

14. The system of claim 11, wherein the computer usable code for selecting further takes into account the urgency of a journey as asserted by a particular mobile element.

15. The system of claim 11, wherein the computer usable code for selecting further takes into account how far in advance a particular mobile element notified the system of a proposed journey, how regularly the particular mobile element use the system, or on payment of a premium for special treatment.

* * * * *